Jan. 25, 1938.  W. AAB  2,106,201
VALVE REFACING TOOL
Filed Feb. 6, 1936
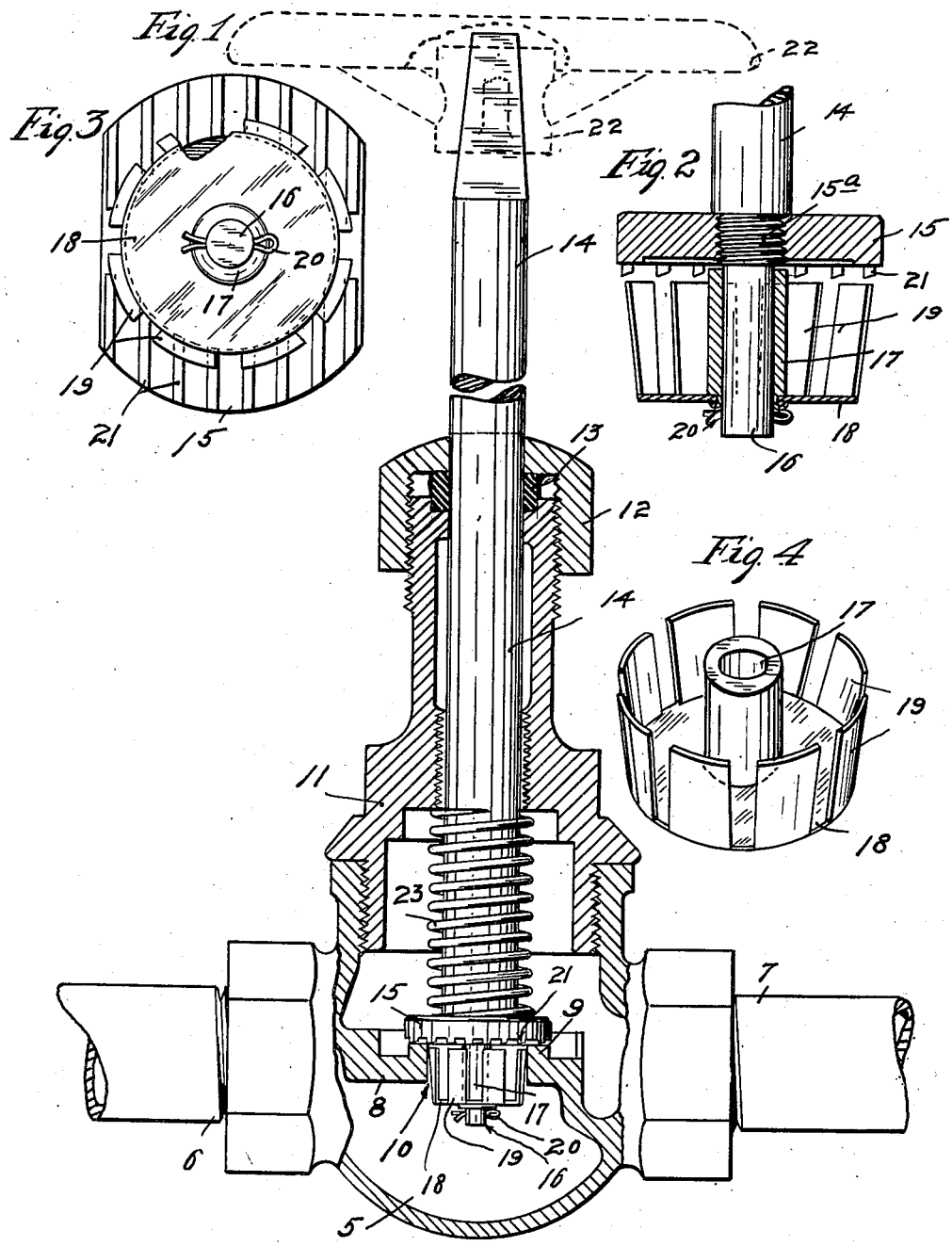
INVENTOR
WILLIAM AAB
By his Attorneys
Merchant & Kilgore Patented Jan. 25, 1938

2,106,201

UNITED STATES PATENT OFFICE 2,106,201

VALVE REFACING TOOL

William Aab, New Ulm, Minn.

Application February 6, 1936, Serial No. 62,622

1 Claim. (Cl. 90—12.5)

My present invention provides an extremely simple, strong, and durable valve refacing tool that is highly efficient for accurately refacing valve seats; and, generally stated, the invention consists of the novel devices, combinations of devices and arrangement of parts hereinafter described and defined in the claim.

This improved valve tool is especially adapted for application to and for the reseating of valves of the type wherein the valve casing is provided with a detachable bonnet that normally guides the valve head stem for directing the valve head against and away from a valve seat formed in a partition that is located in the body of the valve casing between the inlet and outlet thereof. The improved tool comprises the shaft, a cutter-head secured to the shaft, and a centering head applied to the end of the shaft or a projection thereof beyond the cutting face of the cutter-head and in respect to which the shaft and tool are arranged to rotate, when the centering head is frictionally held against rotation thereby.

In the accompanying drawing, which illustrates the invention, like characters indicate like parts throughout the several views.

Referring to the drawing:

Fig. 1 is a view partly in elevation and partly in vertical section showing the improved tool applied in operative position to the valve of the character above briefly described;

Fig. 2 is a detail in section on the line 2—2 of Fig. 1;

Fig. 3 is a bottom plan view of the tool; and

Fig. 4 is a perspective showing the centering head of the tool removed from the shaft thereof.

Of the parts of the valve illustrated, numeral 5 indicates a body having pipe connections 6 and 7, one of which affords an inlet and the other an outlet. Between the inlet and outlet the valve body is formed with a partition, that has the customary angular valve seat 9 formed around an axial passage 10. This valve casing also comprises an upstanding tubular structure 11, usually designated as a bonnet and which is detachably secured to the body of the valve casing by the customary threaded engagement. The bonnet 11, at its upper or outer end, is provided with the customary packing nut 12 which has screw-threaded engagement with the bonnet and clamps the customary packing 13 against the upper end of the bonnet.

The improved tool comprises a shaft or cylindrical bar 14, a cutter-head or valve refacing tool proper 15, and a centering head. The cutter-head 15 is rigidly secured on the shaft 14, this, as shown, being accomplished by a threaded engagement at 15a. Beyond the threaded engagement 15a the shaft is reduced in diameter, as shown at 16, and on this reduced end the centering head is rotatively mounted, or, more properly stated, the shaft and the cutting tool are arranged to rotate in respect to said head. This centering head, as shown, and as preferably designed, comprises a sleeve 17 and an outstanding disc-like portion 18, having circumferentially spaced resilient wings 19. The disc 18 is riveted or otherwise rigidly secured to the outer or lower end of the sleeve 17, and the wings 19 in respect to the axis of the sleeve have a slight backward flare. The centering head as shown is held on the reduced shaft end 16 by a split key 20 or other suitable means. The cutter-head 15 may take various forms, but, as shown, is of the type provided with parallel cutting blades 21. The valve seat 9, has a flat or plane face, and hence the cutting edges of the blades 21 also lie in a common plane; but it will be understood that if the face of the valve seat to be refaced should deviate from the plane then the cutting edges of the blades 21 would be correspondingly extended.

For rotating the tool, the shaft 14 is shown as provided with a handle 22 detachably applicable to the outer end thereof. This handle 22 is indicated by dotted lines only and, of course, may take any desired form. The numeral 23 indicates a coil spring shown as placed around the shaft 14 between the tool 15 and the internal shoulder of the bonnet 11. This spring should be only of such tension as to hold the cutting tool in light engagement with the face of the valve.

The use of the tool is probably obvious from the statements made and from inspection of the drawing, but may be briefly further stated as follows: When the bonnet has been removed from the body of the valve casing and the valve head and its stem have been removed from the bonnet, the cutting tool may be readily and quickly applied to the bonnet. Then when the bonnet has been reapplied to the body of the valve casing, the centering head will be frictionally forced into the axial passage 10 of the valve seat 9, and the cutting tool will then be engaged with the valve seat. When thus applied the centering head will be frictionally held against rotation while the shaft and cutter-head will be free for rotation. When applied as above described the upper portion of the shaft will be guided by the upper portion of the bonnet packing nut and the lower portion of the shaft and the cutting tool will be centered with respect to the valve seat and securely held against lateral vibrations. Moreover, the resiliency in the wings 19 permits the centering head to adapt itself to any slight irregularities or roughness in the axial passage through the valve seat and permits the refacing tool to be progressively fed to its work.

For the final and accurate finishing of the valve seat it is often desirable to relieve the tool from spring pressure and to rotate the tool either under its own weight, by very light manual pressure; and when this action is desired the bonnet will be removed, the tool withdrawn from the bonnet, the spring removed from the shaft and the tool and bonnet reassembled as shown in Fig. 1, but with the spring 23 omitted.

What I claim is:

In a valve refacing tool, a shaft having a cutter head rigidly secured thereon inwardly of one end thereof, a centering head portion journaled on the end of the shaft beyond said cutter head and comprising, a sleeve having a disk-like portion secured to its outer end, means on the shaft engaging the disk-like portion to hold said sleeve in abutting relation with the active face of the center head, said disk-like portion being of materially less diameter than the passageway through the valve to be refaced and having a circumferential series of radially diverging spring wings, the free ends of which extend toward the active face of the cutter head for angular resilient engagement with the sides of the passageway through the valve, whereby said centering head portion functions to laterally support the cutter head irrespective of any irregularities or roughness in the passageway through the valve as the tool is progressively fed to its work.

WILLIAM AAB.